INVENTORS.
James A. Bonuchi
Jack L. Hathorn
BY Ralph S. Zebarth

ATTORNEYS.

United States Patent Office 3,281,890
Patented Nov. 1, 1966

3,281,890
SEPARATION OF POULTRY SHANKS
FROM DRUMSTICKS
James A. Bonuchi, Merriam, Kans., and Jack L. Hathorn,
Independence, and Ralph S. Zebarth, Kansas City, Mo.,
assignors to Gordon Johnson Company, Kansas City,
Mo., a corporation of Missouri
Filed July 27, 1964, Ser. No. 385,339
14 Claims. (Cl. 17—45)

This invention relates to poultry-processing and, more particularly, to a method of severing a poultry carcass leg at the hock joint thereof.

Methods have heretofore been provided for automatically removing the leg shanks from the drumsticks of poultry carcasses but such methods have proven to be unsatisfactory because of the unreliability of severing the leg shanks from the drumsticks at precisely the right location. Unless the hock joint is severed at the righ location, portions of the leg shanks may remain on the heads of the drumsticks or, conversely, portions of the heads of the drumsticks are severed. In either of these cases, the quality of the carcass becomes inferior under conventional grading systems and sales of the carcasses are significantly affected.

The present invention is directed to improvements in the severing of leg shanks from the drumsticks of poultry carcasses so that the legs of a carcass will be severed at precisely the proper position at all times to thereby assure that the quality of the carcass will be maintained. The present invention is specifically directed to a method of severing leg shanks from drumsticks of poultry carcasses at the hock joints of the carcasses as the latter moves in a given direction. As a result, the present invention may be effectively utilized in a carcass dressing process which includes defeathering operations and the conveying of defeathered poultry carcasses to an eviscerating station.

It is, therefore, the primary object of the present invention to provide improvements in the automatic severing of leg shanks from the drumsticks of poultry carcasses wherein the severing action occurs precisely at the center of the hock joints of the carcasses between the heads of the drumsticks and the sockets of the leg shanks which receive the drumstick heads to thereby assure removal of the legs of the carcass without affecting the quality thereof under conventional grading systems.

Another object of the instant invention is the provision of a method of severing the leg shanks from the drumsticks of poultry carcasses wherein the exact center of the hock joints of the carcass are sought and found prior to the beginning of the severing action thereof, whereby the severing of the legs from the carcass occurs at the proper position at all times so long as the hock joint is disposed within a predetermined range of positions relative to the point at which the severing action occurs.

Another object of the present invention is the provision of a method of severing the legs from a poultry carcass which provides for the movement of the hock joints into proper dispositions as the same progress toward a severing station, regardless of the size of the carcass whereby the operation of the instant invention may continue substantially uninterruptedly when the legs of poultry carcasses of different sizes are to be removed from the drumsticks thereof.

Yet another object of this invention is the provision of a method of removing the legs from poultry carcasses as the latter move in a predetermined direction whereby the invention may be employed with poultry defeathering processes so as to render the steps of preparing poultry carcasses for evisceration completely automatic.

A further object of the present invention is the provision of a method of automatically unshackling the leg shanks of poultry carcasses after the leg shanks have been separated from the drumsticks thereof whereby the shackle from which a poultry carcass was initially suspended may be placed in condition for reuse without requiring manual removal of the feet therefrom.

Figure 3:
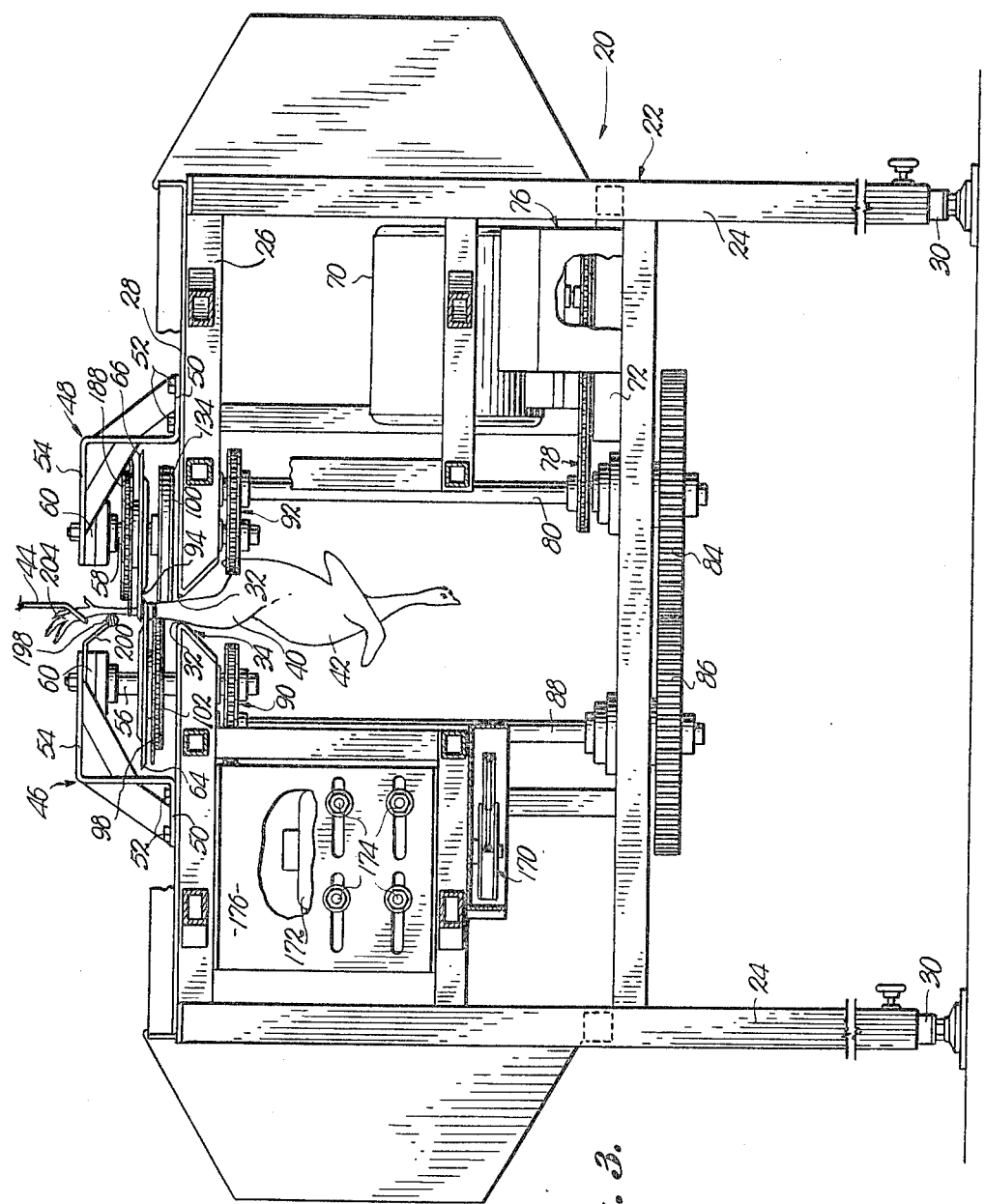

FIG. 3 is a cross-sectional view taken along line 3—3 of FIG. 1 and again illustrating the position of a poultry carcass prior to the severing of the leg shanks thereof from the drumsticks; and FIGS. 4–11 are enlarged, fragmentary, side elevational views of a poultry leg illustrating the steps of the method of the present invention for severing the leg shank from the drumstick precisely at the hock joint of the leg, and for unshackling the leg shank from the shackle of an overhead conveyor.

Machine 20 for separating the leg shanks from the drumsticks of poultry carcasses includes a frame 22 having a number of spaced, upright legs 24 for mounting the upper portion 26 of frame 22 on a supporting surface. A top wall 28 of polygonal configuration covers the top of frame 22 and is normally horizontally disposed by means of leveling feet 30 at the bottom of respective legs 24.

Top 28 has a pair of spaced, generally parallel edges 32, shown in FIG. 3, and defining a longitudinally extending slot 34 spanning the distance between one end 36 of frame 22 and the opposite end 38 thereof. Slot 34 is adapted for receiving the legs 40 of a poultry carcass 42 as the latter moves longitudinally of slot 34 in a suspended condition below a shackle 44 forming a part of an overhead conveyor.

Figure 1:
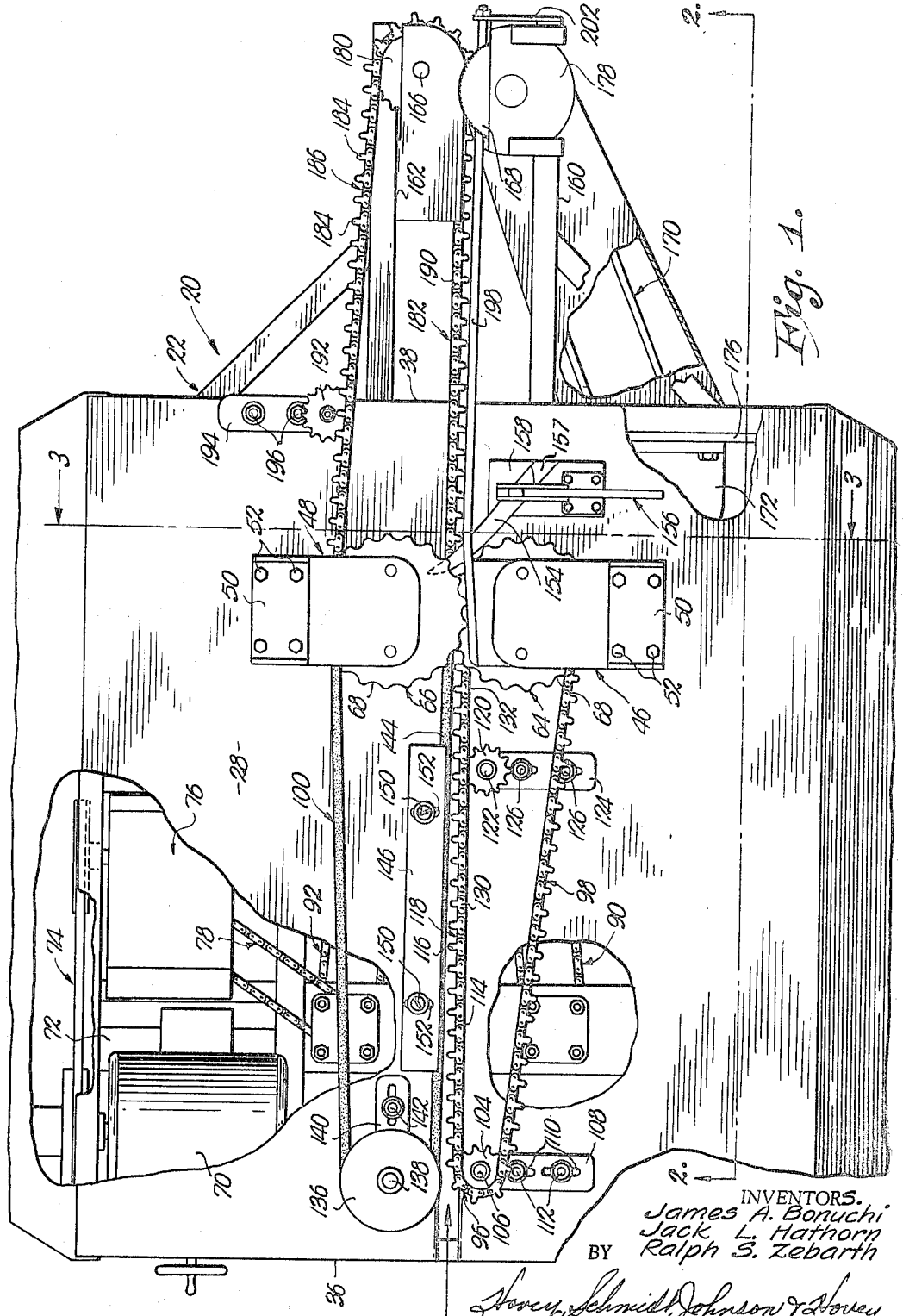
FIGURE 1 is a top plan view of an apparatus made pursuant to the concepts of the present invention and employed for carrying out the method of separating the leg shanks from the drumsticks of poultry carcasses at the hock joints thereof, parts being broken away to illustrate details of construction.
Figure 2:
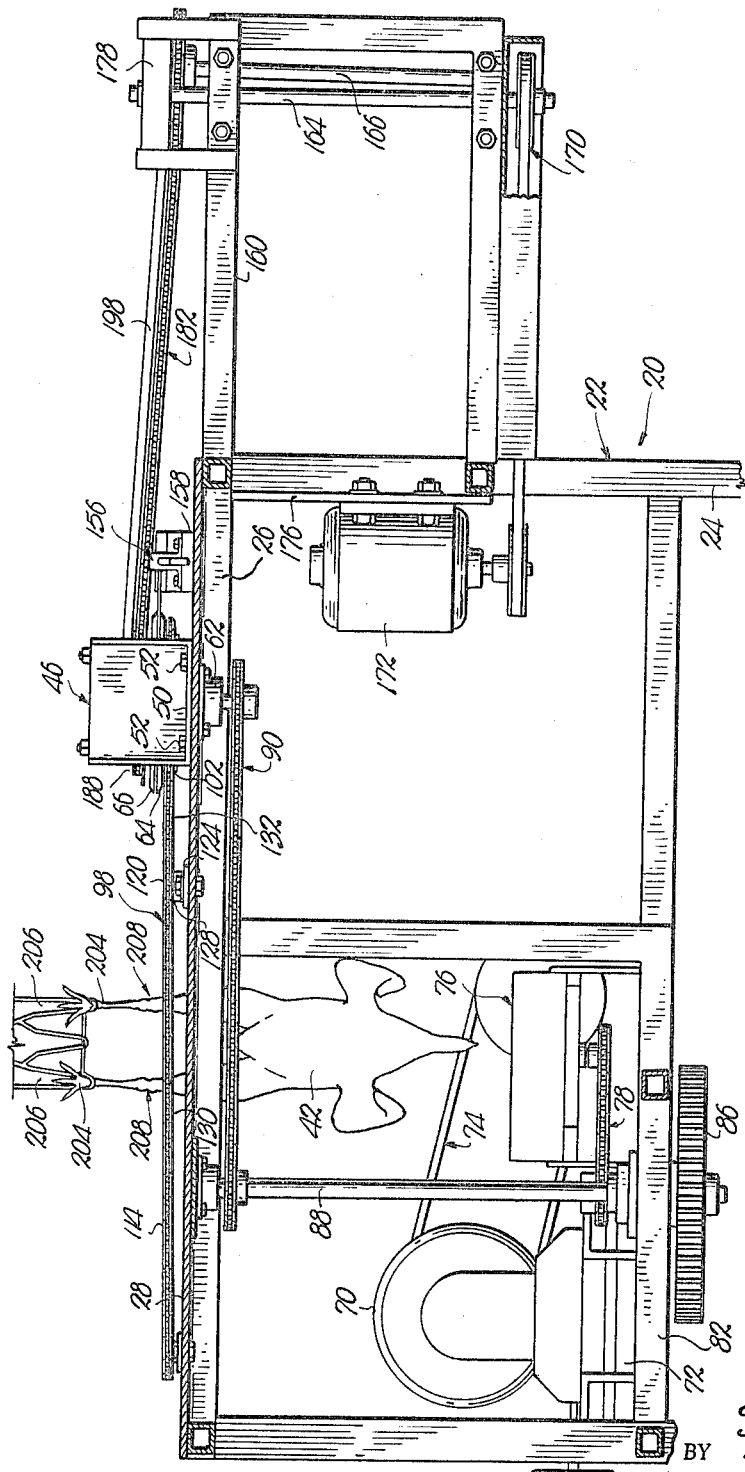
FIG. 2 is a cross-sectional view taken along line 2—2 of FIG. 1 and illustrating the normal position of a poultry carcass as the latter moves toward a cutting station under the influence of an overhead conveyor.

A pair of spaced, L-shaped brackets 46 and 48 each have a flange 50 which is secured by bolt means 52 to top wall 28 on opposed sides of slot 34 as shown in FIG. 3. A section 54 of each of the brackets 46 and 48 is spaced above and is substantially parallel with top wall 28 and aligned with section 54 of the adjacent bracket as illustrated in FIGS. 1 and 2.

A pair of vertically disposed shafts 56 and 58 are provided for brackets 46 and 48 respectively. Shafts 56 and 58 are mounted for rotation on sections 54 of brackets 46 and 48 respectively, by means of bearings 60 secured to the undersides of sections 54 as shown in FIG. 3. Bearings 62, only one of which is shown in FIG. 2, are secured to the underside of top wall 28 for journalling the lower ends of shafts 56 and 58. As shown in FIG. 1, brackets 46 and 48 are disposed adjacent to end 38 of frame 22 and thus are spaced a considerable distance from end 36 thereof.

A pair of wheels 64 and 66 are rigid to shafts 56 and 58 respectively, for rotation therewith. Wheels 64 and 66 are partially overlapped as shown in FIG. 3 and are provided with arcuate recesses 68 in the peripheries thereof so that, upon rotation of the wheels 64 and 66 in opposed directions, the recesses of one of the wheels are successively closed by the other wheel during a portion of the rotation of the wheels and as the recesses are in substantially overlying relationship to slot 34 and top wall 28.

As also shown in FIG. 3, the peripheries of wheels 64 and 66 are beveled with the upper face of wheel 64 being of a greater diameter than the lower face thereof and with the lower face of wheel 66 being of a greater diameter than the upper face thereof.

Means for rotating shafts 56 and 58 in opposed directions and at the same speed, include a prime mover 70 secured to frame 22 on a platform 72 below top wall 28 and adjacent to end 36, as shown in FIGS. 1 and 2. A belt and pulley assembly 74 couples prime mover 70 to a gear reduction mechanism 76 also mounted on platform 72, mechanism 76 being in turn coupled by a chain and sprocket assembly 78 to a shaft 80 disposed uprightly between top wall 28 and a crosspiece 82 extending longitudinally of frame 22 in spaced relationship below top wall 28. Shaft 80 is disposed on one side of slot 34 and is journaled for rotation with respect to frame 22. A spur gear 84, rigid to the lower end of shaft 80, is in mesh with a spur gear 86 rigid to the lower end of a shaft 88 parallel to shaft 80 and journaled for rotation with respect to frame 22 on the opposite side of slot 34 from shaft 80.

Chain and sprocket assembly 90 couples the upper end of shaft 88 with the lower end of shaft 56 for rotating the latter upon rotation of shaft 88. A chain and sprocket assembly 92 couples the upper end of shaft 80 with the lower end of shaft 58 for rotating the latter in response to the rotation of shaft 80. Shafts 80 and 88 rotate in opposed directions, as do shafts 58 and 56, by virtue of the presence of spur gears 84 and 86, it being clear that prime mover 70 operates in a direction to cause wheel 64 to rotate in a clockwise sense, and wheel 66 to rotate in a counterclockwise sense when viewing FIG. 1. Wheels 64 and 66 are separated by a small distance to define a space 94 for a purpose hereinafter described.

Structure 96, movable in unison with the overhead conveyor, is provided on frame 22 above top wall 28 for advancing the legs 40 of a carcass 42 between ends 36 and 38 of frame 22. Structure 96 includes apparatus having an endless, flexible link chain 98 and an endless, flexible belt 100, each disposed on a respective side of slot 34 and above the latter as shown in FIG. 3. Chain 98 is coupled with a sprocket 102 rigid to shaft 56 below wheel 64 and to a sprocket 104 mounted on an upright shaft 106 carried by a bracket 108, the latter being provided with longitudinally extending slots 110 which receive bolt means 112 for adjustably securing shaft 106 on top wall 28.

Chain 98 has a stretch 114 which normally extends parallel to slot 34 between sprockets 102 and 104. Chain 98 is further provided with a number of spaced, laterally extending projections 116, each pair of adjacent projections 116 defining a drumstick-receiving fork 118 which moves with chain 98 along and above slot 34 from sprocket 104 to sprocket 102 inasmuch as shaft 56 and thereby sprocket 102, rotates in a clockwise direction when viewing FIG. 1. A sprocket 120 is carried by a shaft 122 disposed between shafts 56 and 106 and mounted on a bracket 124 adjustably secured by means of bolt means 126 to top wall 28.

As shown in FIG. 2, sprocket 120 is disposed at a greater distance away from top wall 28 than is sprocket 104 by virtue of spacer means 128. However, shafts 106 and 122 are substantially parallel with each other. Chain 98 is operably coupled with sprocket 120 as shown in FIG. 1 so that one portion 130 of stretch 114 is inclined with respect to the upper surface of top wall 28 between sprockets 104 and 120. Sprockets 102 and 120 are substantially at the same distance from top wall 28 so that the portion 132 of stretch 114 between sprockets 102 and 120 is parallel with top wall 28 and if the latter is horizontal, portion 132 will also be horizontal.

A pulley 134 is rigidly secured to shaft 58 below wheel 66 and belt 100 is trained about pulley 134 and about another pulley 136 rigid to a shaft 138 carried on top wall 28 by a bracket 140 and bolt means 142. Shaft 138 is aligned with shaft 58 so that a line interconnecting the shafts would be substantially parallel with slot 34. Pulley 136 is of a smaller diameter than pulley 134. Thus, the stretch 144 of belt 100 adjacent slot 34 converges toward stretch 114 of chain 98 as wheels 64 and 66 are approached.

A rigid guide 146 having a recess 148 (FIGS. 6 and 7) extends longitudinally of slot 34 and is adjustably secured by bolt means 150 to top wall 28 by means of transverse, bolt-receiving slots 152 therein. Stretch 144 is normally disposed within recess 148 and movable therealong at the same speed as stretch 114 inasmuch as pulley 134 is of substantially the same diameter as sprocket 102. As shown in FIG. 1, guide 146 is spaced from wheels 64 and 66 and is canted relative to stretch 114 to assure that stretch 144 converges toward stretch 114 without any substantial lateral deflection of belt 100 away from stretch 114 as wheels 64 and 66 are approached. The extent by which stretch 144 converges to stretch 114 can be adjusted by varying the canted position of guide 146.

As shown in FIG. 3, belt 100 is normally movable in a horizontal plane parallel to the plane of top wall 28 so that belt 100 will engage a leg 40 of a carcass 42 at substantially the same location thereon as the carcass 42 moves toward wheels 64 and 66. Since portion 130 is inclined, the corresponding fork 118 will progressively move upwardly until the head of the drumstick of leg 40 is supported on projections 116.

A knife blade 154 is secured by means of a clamp 156 within a groove 157 of a base 158 rigid to top wall 28 adjacent end 38. Blade 154 extends across slot 34 adjacent to wheels 64 and 66 and is substantially horizontally aligned with space 94 between wheels 64 and 66. Blade 154 is provided to sever the tendons of legs 40 after wheels 64 and 66 have separated the heads of the drumsticks of leg 40 from the sockets of the leg shanks of legs 40.

A pair of extensions 160 and 162 project outwardly from frame 22 at end 38 thereof as shown in FIGS. 1 and 2. Extensions 160 and 162 are disposed on opposed sides of a line extending longitudinally with respect to slot 34 and mount, by suitable bearing means, a pair of upright shafts 164 and 166 respectively at the outer extremities thereof. A cutting saw 168 is rigid to the upper end of shaft 164 for rotation therewith. A belt and pulley assembly 170 couples the lower end of shaft 164 with a prime mover 172 adjustably secured by bolt means 174 to a side plate 176 forming a part of frame 22 below top wall 28 and adjacent to end 38. A guard 178 extends partially about saw 168 for safety purposes. A sprocket 180 is rigid to the upper end of shaft 166 and is coupled with an endless, flexible mechanism or chain 182 having projections 184 similar in all respects to projections 116 to define, between adjacent pairs of projections 184, leg shank-receiving forks 186.

Chain 182 is coupled with a sprocket 188 rigid to shaft 58 for rotation therewith. Since shaft 58 rotates in a counterclockwise sense when viewing FIG. 1, stretch 190 of chain 182 moves from sprocket 188 toward sprocket 180 along a path extending below, but in close proximity, to saw 168. Sprocket 188, however, is disposed at a higher elevation with respect to frame 22 than is sprocket 180 so that the major portion of chain 182 lies in a plane inclined outwardly and downwardly with respect to top wall 28 as shown in FIG. 2. Since shaft 166 is inclined with respect to shaft 58, sprocket 180 will be substantially in the plane of the major portion of chain 182, whereas sprocket 188 will be slightly inclined relative to this plane.

A sprocket 192 is carried by a bracket 194 adjustably secured by bolt means 196 to top wall 28 adjacent end 38 of frame 22. Sprocket 192 is coupled with chain 182 to tighten the latter.

A guide bar 198 spans the distance between bracket 46 and the outer extremity of extension 160 as shown in FIGS. 1 and 2. Bar 198 is secured at one end thereof by a rigid projection 200 (FIG. 3) to bracket 46 and at the other end thereof to a plate 202 rigid to extension 160 as shown in FIG. 1. Bar 198 extends substantially parallel to, but slightly above stretch 190 of chain 182, and passes beneath saw 168.

*Operation*

To place machine 20 in operation, prime movers 70 and 172 are actuated. Actuation of prime mover 70 causes wheels 64 and 66 to rotate in opposed directions and causes stretches 114 and 144 of chain 98 and belt 100 respectively, to move from end 36 of frame 22 toward wheels 64 and 66 at the same speed above slot 34. Actuation of prime mover 70 also effects the movement of stretch 190 of chain 182 in a direction away from wheels 64 and 66 and toward the outer extremity of extension 162. Actuation of prime mover 172 causes saw 168 to be rotated at a relatively high speed for severing the leg shanks carried toward the same by forks 186 of chain 182 as the leg shanks are suspended from shackle 44 thereabove.

A poultry carcass 42 suspended by the feet 204 thereof in the notches 206 of shackle 44, is moved by means of the overhead conveyor coupled with shackle 44 toward machine 20 in alignment with slot 34. The height of shackle 44 is set so that carcass 42 will be normally disposed below top wall 28, and the hock joints 208 of legs 40 will be above sprocket 104 about which chain 98 is trained. Portion 130 of stretch 114 is inclined so that poultry carcasses of substantially all sizes will have their hock joints 208 above sprocket 104 for a given setting of the height of shackle 44 above top wall 28.

As the carcass 42 approaches chain 98, one of the legs 40 leads the other leg 40 and both legs will successively move into forks 118 inasmuch as chain 98 is moving at the same speed as the overhead conveyor to which shackle 44 is attached.

For the most part, the hock joints 208 will normally be spaced above chain 98 as the drumsticks of legs 40 are initially received within forks 18. Thus, as portion 130 moves toward sprocket 120, projections 116 will move upwardly with respect to hock joints 208 until the latter substantially rest on projections 116. For large carcasses 42, this will occur before sprocket 120 is approached. For smaller carcasses 42, this will occur at a later time than for large carcasses.

As the drumsticks are conveyed toward wheels 64 and 66, stretch 144 of belt 100 progressively moves toward the drumstick and tightens its grip thereon to prevent any relative movement of the drumstick with respect to stretches 114 and 144.

Figure 4:
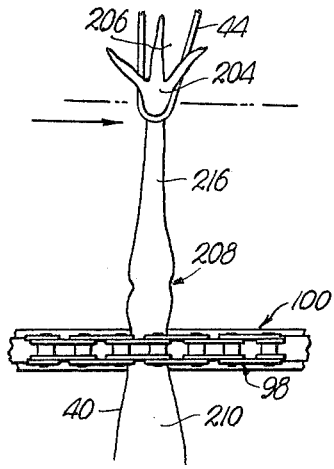
Figure 5:
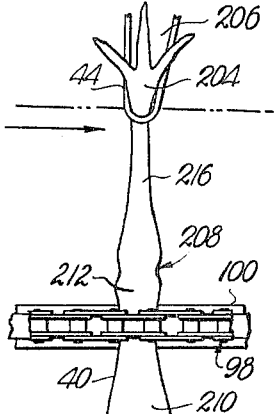
Figure 6:
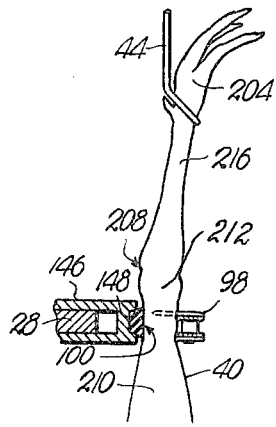

By the time the drumstick reaches sprocket 120, the corresponding hock joint 208 will be resting on projections 116 with the feet 204 lifted slightly out of notches 206 of shackle 44 and the carcass 42 will be conveyed in this disposition toward wheels 64 and 66 inasmuch as stretch 144 tightly grips the drumstick at a location slightly below portion 132 of stretch 114. FIG. 4 shows the drumstick 210 gripped on opposed sides by portion 130 and stretch 144 as portion 130 moves along an inclined path with respect to top wall 28; FIG. 5 shows the position of the head 212 of drumstick 210 as the head is resting on projections 116 and as drumstick 210 approaches sprocket 120; FIG. 6 illustrates the position of drumstick 210 as shown in FIG. 5, but looking in the direction of travel thereof. Thus, with the feet 204 of leg 40 being shackled in notches 206 of shackle 44, carcass 42 is advanced while being suspended by its feet and drumsticks 210 thereof are grasped below head 212 of drumsticks 210, chain 98 and belt 100 limiting the extent of downward movement of legs 40 as carcass 42 is moved toward wheels 64 and 66. The converging of stretch 144 toward stretch 114 progressively increases the grasp or the impalement of the drumsticks 210 during advancement of the carcass so that, in effect, the carcass 42 becomes suspended from heads 212.

Wheels 64 and 66 are timed with respect to the movement of chain 98 so that the hock joints 208 will move into a pair of cooperating recesses 68 on wheels 64 and 66. The wheels apply a combination cutting and wedging action to hock joints 208 laterally of the direction of advancement of carcass 42 at substantially the centers of hock joints 208 while the suspended carcass 42 is advanced. Such cutting and wedging action severs the skin covering the hock joints therearound and forces heads 212 of drumsticks 210 out of the sockets 214 of leg shanks 216 at the outer extremities of legs 40, thereby leaving carcass 42 suspended by the tendons 218 of legs 40. If a hock joint 208 is not precisely aligned with the beveled edges of wheels 64 and 66, such beveling of the edges causes wheels 64 and 66 to seek out the center of the hock joint 208 inasmuch as the blade edges will move over the convex, rigid portions 220 and 222 on the head 212 and socket 214 respectively, until the exact center is found.

Figure 7:
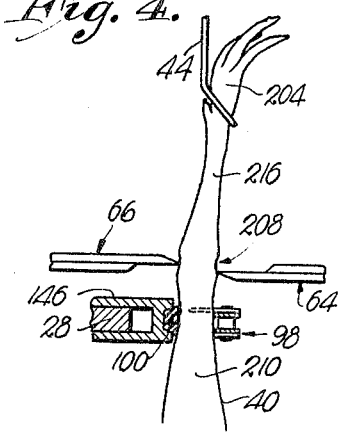
Figure 8:
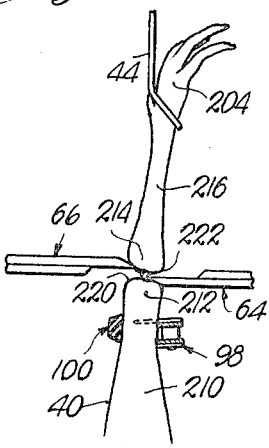

Since wheels 64 and 66 are immovable vertically, and since portion 132 and stretch 144 can be flexed slightly, this causes the drumstick 210 to move upwardly or downwardly, depending upon the way in which the hock joint 208 must move in order for wheels 64 and 66 to seek out the center of the joint. As shown in FIG. 7, the hock joint 208 is initially slightly higher than it should be in order for wheels 64 and 66 to be aligned with the center of the joint. As shown in FIG. 8, the hock joint 208 has moved downwardly inasmuch as wheels 64 and 66 have moved over the convex, rigid portions 220 and 222 respectively, until the wheel edges have reached the center of the joint. This causes chain 98 and belt 100 to flex downwardly slightly to permit downward movement of the leg 40. Head 212 is thus separated from socket 214, leaving leg shank 216 connected to drumstick 210 by tendons 218 which pass through space 94 between wheels 64 and 66.

Chain 98 and belt 100 move out of engagement with drumstick 210, and carcass 42 is suspended by feet 204 through tendons 218. The tendons 218 are severed by blade 154 and carcass 42 gravitates to a conveyor or other collection device disposed below top wall 28 and adjacent end 38.

As hock joints 208 move between wheels 64 and 66 such joints, in effect, are impaled by wheels 64 and 66, such impalement progressively increasing to shift heads 212 away from sockets 214 and place the joints into impalement at substantially the centers thereof.

Forks 186 defined by projections 184 receive leg shanks 216 and move at the same speed as shackle 44 to convey the leg shanks 216 toward saw 168. By virtue of bar 198, leg shanks 216 are effectively grasped at points between feet 204 and sockets 214 thereof, while leg shanks 216 are conveyed toward saw 168. Leg shanks 216 are severed between feet 204 and the point of grasping thereon by chain 182 and bar 198. By cutting leg shanks 216 at this location, the same become unbalanced by virtue of the greater weight of the feet 204 thereof so that the feet and the portion of the leg shanks 216 attached thereto, gravitate from notches 206 of shackle 44. The lower portions of shanks 216 severed by saw 168, gravitate from the latter.

Figure 10:
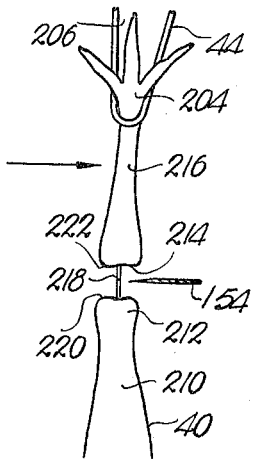
Figure 11:
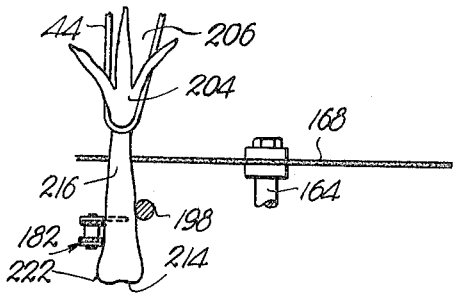

As shown in FIG. 10, tendons 218 are about to be severed by blade 154 during continued advancement of shackle 44 thereabove. As shown in FIG. 11, a leg shank is shown approaching saw 168 for severing by the latter as the leg shank is grasped on opposed sides thereof by chain 182 and bar 198.

Machine 20 is suitable for use in poultry dressing lines for severing the leg shanks 216 of the legs 40 of carcasses 42 after the latter have been defeathered by automatic defeathering equipment. Carcasses 42 thus are made ready for evisceration substantially immediately after the defeathering operation inasmuch as the time required for a carcass 42 to pass through machine 20 is negligible in comparison with the over-all dressing time of the carcass.

Machine 20 provides means for cleanly severing leg shanks 216 from carcasses 42 without leaving any portion of the leg shanks on the drumsticks or without severing any part of the drumsticks so as to cause down-grading of the quality of the carcasses themselves.

Figure 9:
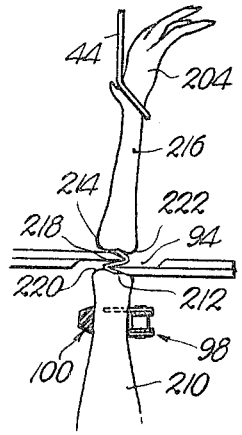

Machine 20 provides means for severing the leg shanks from the legs of carcasses of different sizes inasmuch as wheels 64 and 66 seek the center of the hock joints before the separation of heads 212 from sockets 214 occurs. As shown in FIGS. 7–9, if a hock joint is too high, wheels 64 and 66 will seek the center of the joint by lowering the entire carcass when wheel 64 passes over portions 220 on the head 212. This causes chain 98 and belt 100 to flex downwardly. Conversely, if the hock joint is too low, wheels 64 and 66 will seek the center of the joint by raising the entire carcass when wheel 66 passes beneath portion 222 on socket 214. This causes chain 98 and belt 100 to flex upwardly.

Having thus described the invention, what is claimed as new and desired to be secured by Letters Patent is:

1. The method of separating the shanks from the drumsticks of the legs of a poultry carcass at the hock joints thereof wherein said joints include heads on said drumsticks and sockets on said shanks, said method comprising the steps of:
   suspending said carcass by its feet;
   advancing the suspended carcass;
   grasping the drumsticks below their heads to limit the extent of downward movement of the latter during advancement;
   raising said carcass by the drumsticks during advancement to align the hock joint into a predetermined height as it is advanced into said station;
   applying a combination cutting and wedging action to said joints therearound, inwardly thereof, laterally of their direction of advancement and substantially at the centers of the joints while the suspended carcass is advanced, to sever the skin coverings of the joints and to force the heads out of the sockets;
   releasing the grasp on the drumsticks to leave the carcass suspended by the feet from the tendons of the legs; and
   thereupon cutting said tendons between the heads and the sockets to permit the carcass to drop.

2. The method of separating the shanks from the drumsticks of the legs of a poultry carcass at the hock joints thereof wherein said joints include heads on said drumsticks and sockets on said shanks, said method comprising the steps of:
   suspending said carcass by its feet;
   advancing the suspended carcass;
   grasping the drumsticks below their heads to limit the extent of downward movement of the latter during advancement;
   applying a combination cutting and wedging action to said joints therearound, inwardly thereof, laterally of their direction of advancement and substantially at the centers of the joints while the suspended carcass is advanced, to sever the skin coverings of the joints and to force the heads out of the sockets;
   releasing the grasp on the drumsticks to leave the carcass suspended by the feet from the tendons of the legs;
   cutting said tendons between the heads and the sockets to permit the carcass to drop;
   grasping the shanks at a point between the feet and the sockets;
   cutting through the shanks between the feet and said points;
   releasing the grasp on the shanks, permitting them to drop; and
   releasing the feet from suspension.

3. The method of separating the shanks from the drumsticks of the legs of a poultry carcass at the hock joints thereof wherein said joints include heads on said drumsticks and sockets on said shanks, said method comprising the steps of:
   suspending said carcass by it feet;
   advancing the suspended carcass toward a separation and severance station;
   grasping the drumsticks at a point below their heads while the carcass is advanced;
   raising said carcass by the drumsticks during advancement to align the hock joint into a predetermined height as it is advanced into said station;
   progressively increasing the grasp on the drumsticks and against the heads therebelow during advancement until the carcass becomes suspended from said heads;
   applying a combination cutting and wedging action to said joints therearound, inwardly thereof, laterally of their direction of advancement and substantially at the centers of the joints while the suspended carcass is advanced, to sever the skin coverings of the joints and to force the heads out of the sockets;
   releasing the grasp on the drumsticks to leave the carcass suspended by the feet from the tendons of the legs; and
   thereupon cutting said tendons between the heads and the socket to permit the carcass to drop.

4. In the method of separating the shank and the drumstick of a poultry carcass leg at the hock joint thereof, the steps of:
   applying generally opposed forces to the leg laterally thereof in an inward direction on opposite sides of the leg, at said joint, with the forces offset in a direction longitudinally of the leg whereby one of the forces is applied at said joint to the convex rigid portion of the head of the drumstick, shifting the same inwardly and longitudinally of the leg in one direction, and the opposite of said forces is applied to the convex rigid portion of the socket of said shank, shifting the same inwardly and longitudinally of the leg in the opposite direction;
   continuing the application of said forces with a wedging action until the proximal ends of the bones of the shank and the drumstick are spaced apart; and
   severing the skin and the tissue of the leg at the joint while said bones are being wedged apart.

5. The invention of claim 4, wherein is included the step of supporting the carcass by the drumstick adjacent the joint during separation, said supporting of the carcass being yieldable whereby to permit movement of the drumstick longitudinally of the leg in response to the application of said forces.

6. In the method of separating the shank and drumstick of a poultry carcass leg at the hock joint thereof, the steps of:
   suspending the carcass from said shank;
   advancing the carcass toward a separation and severance station;
   grasping the drumstick adjacent said joint while the carcass is suspended and advanced;
   raising said carcass by the drumstick during advancement to align the hock joint into a predetermined height as it is advanced into said station;
   applying generally opposed forces at said station to the leg laterally of the leg and of its path of advancement in an inward direction on opposite sides of the leg with the forces vertically offset whereby one of the forces is applied to the convex rigid portion of the head of said drumstick, shifting the same inwardly and longitudinally of the leg in one direction, and the opposite of said forces is applied to the convex rigid portion of the socket of said shank, shifting the same inwardly and longitudinally of the leg in the opposite direction;

continuing the application of said forces during advancement with a wedging action until the proximal ends of the bones of the shank and the drumstick are spaced apart; and severing the skin and the tissue of the leg at the joint while said bones are being wedged apart.

7. The method of separating the shank and the drumstick of a poultry carcass leg at the hock joint thereof comprising the steps of:

applying generally opposed combination cutting and wedging forces to said leg laterally thereof at said joint with the forces offset in a direction longitudinally of the leg whereby one of the forces is applied at said joint to the convex rigid portion of the head of said drumstick, shifting the same inwardly and longitudinally of the leg in one direction, and the opposite of said forces is applied to the convex rigid portion of the socket of said shank, shifting the same inwardly and longitudinally of the leg in the opposite direction to sever the skin covering of the joint therearound and to force the head of said drumstick out of the socket of said shank; and thereupon cutting the tendons of said leg between said head and said socket.

8. The method as set forth in claim 7 wherein is included the steps of suspending said carcass by its feet and advancing the suspended carcass prior to the application of said combination forces.

9. The method as set forth in claim 8 including the step of:

shackling the feet of said carcass and placing it in suspension by said shackled feet prior to advancing the carcass; and unshackling the feet and shanks following cutting of said tendons.

10. The method as set forth in claim 9 wherein the steps of unshackling the feet and shanks includes the step of cutting through the shanks between the feet and the sockets to permit the same to drop from the shackles.

11. The method of separating the shanks from the drumsticks of the legs of a poultry carcass at the hock joints thereof comprising the steps of:

suspending said carcass by its feet;

advancing the suspended carcass toward a separation station;

grasping said drumsticks adjacent said joints to limit the extent of downward movement of said drumsticks as the carcass is suspended and advanced;

raising said carcass by the drumsticks during advancement to align the hock joint into a predetermined height as it is advanced into said station;

applying generally opposed combination cutting and wedging forces offset in a direction longitudinally of the leg whereby one of the forces is applied at said joint to the convex rigid portion of the drumstick, shifting the same inwardly and longitudinally of the leg in one direction, and the opposite of said forces is applied to the convex rigid portion of the socket of said shank, shifting the same inwardly and longitudinally of the leg in the opposite direction to sever the skin covering of the joint therearound and to force the head of said drumstick out of the socket of said shank; and thereupon cutting said tendons between said heads and said sockets, releasing the suspension.

12. The method of separating the shanks from the drumsticks of the legs of a poultry carcass at the hock joints thereof wherein said joints include heads on said drumsticks and sockets on said shanks, said method comprising the steps of:

suspending the carcass by said head;

advancing the suspended carcass;

applying generally opposed combination cutting and wedging forces to said leg laterally thereof at said joint with the forces offset in a direction longitudinally of the leg whereby one of the forces is applied at said joint to the convex rigid portion of the head of said drumstick, shifting the same inwardly and longitudinally of the leg in one direction, and the opposite of said forces is applied to the convex rigid portion of the socket of said shank, shifting the same inwardly and longitudinally of the leg in the opposite direction to sever the skin covering the joint therearound and to force the head of said drumstick out of the socket of said shank; and thereupon cutting the leg tendons between the heads and the sockets.

13. In the method of separating the shank from the drumstick of the leg of a poultry carcass at the hock joint thereof wherein said joint includes a head on said drumstick and a socket on said shank, said method including the steps of:

applying generally opposed combination cutting and wedging forces to said leg laterally thereof at said joint with the forces offset in a direction longitudinally of the leg whereby one of the forces is applied at said joint to the convex rigid portion of the head of said drumstick, shifting the same inwardly and longitudinally of the leg in one direction, and the opposite of said forces is applied to the convex rigid portion of the socket of said shank, shifting the same inwardly and longitudinally of the leg in the opposite direction;

progressively increasing the intensity of the wedging forces to shift the head out from between said forces and place the joint between said forces at substantially the center thereof; and increasing the intensity of the wedging forces on the joint until the head of the drumstick is forced out of the socket of said shank.

14. The method as set forth in claim 13 wherein is included the step of supporting, prior to the application of said combination forces, the leg for movement of the shank and drumstick relatively away from each other.

References Cited by the Examiner

UNITED STATES PATENTS

| | | | |
|---|---|---|---|
| 2,846,718 | 8/1958 | Sengelaub et al. | 17—11 |
| 2,854,690 | 10/1958 | O'Donnell | 17—45 |
| 2,855,624 | 10/1958 | Jerome et al. | 17—11 |
| 3,038,197 | 6/1962 | Turner | 17—11 |
| 3,056,161 | 10/1962 | Zebarth | 17—11 |
| 3,099,858 | 8/1963 | Segur | 17—45 |
| 3,137,892 | 6/1964 | Best et al. | 17—11 |
| 3,199,143 | 8/1965 | Ousley et al. | 17—11 |

SAMUEL KOREN, *Primary Examiner.*

LUCIE H. LAUDENSLAGER, *Examiner.*